United States Patent

Bixel, Jr.

[11] 3,882,218
[45] May 6, 1975

[54] BRICK TEXTURED BUILDING PANELS AND THEIR METHOD OF MANUFACTURE AND INSTALLATION

[76] Inventor: Charles G. Bixel, Jr., 395 Gardiner Dr., Fort Walton Beach, Fla. 32548

[22] Filed: July 11, 1973

[21] Appl. No.: 378,317

[52] U.S. Cl. .................. 264/157; 52/314; 52/742; 264/129; 264/293; 264/321
[51] Int. Cl. ..... B29c 3/00; B29c 17/14; B29d 27/00
[58] Field of Search ............ 264/321, 293, DIG. 71, 264/157, 129; 52/309, 314, 742

[56] References Cited
UNITED STATES PATENTS

| | | | |
|---|---|---|---|
| 2,722,719 | 11/1955 | Altstadter | 264/DIG. 71 |
| 3,177,279 | 4/1965 | Bilodeau | 52/314 X |
| 3,217,453 | 11/1965 | Medow | 52/314 |
| 3,222,437 | 12/1965 | Schilling | 264/321 UX |
| 3,304,673 | 2/1967 | Ramoneda | 52/314 X |
| 3,309,440 | 3/1967 | Kracht | 264/321 X |
| 3,370,117 | 2/1968 | Blue | 264/321 |
| 3,392,080 | 7/1968 | Mercer | 264/321 X |
| 3,402,232 | 9/1968 | De Rusha | 264/129 |
| 3,410,044 | 11/1968 | Moog | 52/309 |
| 3,450,326 | 6/1969 | Foote | 264/321 UX |
| 3,506,749 | 4/1970 | Weissman | 264/321 X |
| 3,524,790 | 8/1970 | Mason | 52/314 X |
| 3,670,064 | 6/1972 | Edwards et al. | 264/321 X |

FOREIGN PATENTS OR APPLICATIONS

| | | | |
|---|---|---|---|
| 43-26100 | 11/1968 | Japan | 264/321 |
| 577,151 | 3/1958 | Italy | 264/293 |
| 890,506 | 2/1962 | United Kingdom | 264/321 |

*Primary Examiner*—Philip E. Anderson
*Attorney, Agent, or Firm*—Newton, Hopkins & Ormsby

[57] ABSTRACT

Base Building panels, which have been cut from large blocks of expanded, high-density, foamed plastic, include an array of grooves which, together with the non-grooved areas of the panels simulate the desired brick-and-mortar appearance, the grooves having been formed by an appropriate array of heating elements. The panels may be utilized as skirting or underpinning for mobile homes so as to present a permanent foundation appearance for the home. To install the panels, small blocks of expanded, high-density, foamed plastic are bonded to the back surfaces of the panels so as to provide a panel interlock mechanism. A perimetrical trench is excavated beneath the exterior wall surfaces of the mobile home, whereupon the bottom edge portions of the panels are inserted within the trench, while the upper edge portions are secured to the mobile home undersurface by means of additional small blocks of foamed plastic which have been coated with plastic adhesive. Access panels and ventilation means may be inserted within the skirt enclosure, and the enclosure may be painted a particular color or a multitude of colors according to a particular design.

3 Claims, 13 Drawing Figures

BRICK TEXTURED BUILDING PANELS AND THEIR METHOD OF MANUFACTURE AND INSTALLATION

BACKGROUND OF THE INVENTION

The present invention relates generally to building panels and more particularly to brick-textured structural panels of expanded, high-density, foam plastic for use as underpinning or skirting upon mobile homes, and to a method of manufacturing and installing the same.

Mobile homes must of necessity be capable of being moved or transported quickly and easily. For this reason they are often mounted upon a plurality of concrete or cinder building blocks, as opposed to permanent foundations, the homes therefore being suspended above the ground-line by a distance corresponding to the height of the blocks. The open space existing between the bottom portion of the mobile home and the ground is generally considered unsightly however, complete enclosure of which, with cement or brick foundations, is not feasible due to the necessity of maintaining the homes in their mobile states, as well as the fact that such foundations are quite expensive. In addition, the existence of the aforementioned open space facilitates the escape of heat and cool air from the home's heating or air-conditioning system, thereby increasing heating and air-conditioning costs.

SUMMARY OF THE INVENTION

Accordingly, it is an object of the present invention to provide brick-textured building panels and a method of manufacturing and installing such panels which will render a brick foundation effect for, and enhance the appearance of, mobile homes.

Another object of the present invention is to provide brick-textured building panels and a method of manufacturing and installing such panels which may be easily and quickly erected, or removed and transported if relocation of the home be required.

Still another object of the present invention is to provide brick-textured building panels and a method of manufacturing and installing such panels which will be relatively inexpensive and available in various designs and colors.

Yet another object of the present invention is to provide brick-textured building panels and a method of manufacturing and installing such panels which will serve to insulate the underside portion of the home, thereby substantially reducing heating and air-conditioning costs.

It is a further object of the present invention to provide a brick-textured building panels and a method of manufacturing and installing such panels which serve to acoustically insulate the home.

A yet further object of the present invention is to provide brick-textured building panels and a method of manufacturing and installing such panels which will accommodate terrain fluctuations surrounding the home-site.

The foregoing objectives are achieved according to this invention through the provision of base building panels which have been cut from large blocks of expanded, high-density, foamed plastic. The panels include an array of grooves which, together with the non-grooved areas of the panels, simulate the desired brick-and-mortar appearance, the grooves having been formed by an appropriate array of heating elements. The panels may be subsequently painted a particular color and/or according to specific designs utilizing a plurality of colors. To install the panels upon the mobile home, small blocks of expanded, high-density, foamed, plastic are bonded to the rear surfaces of the panels so as to provide a panel interlock mechanism, whereby the individual panels may be interlockingly assembled to one another. A perimetrical trench is dug beneath the exterior wall surfaces of the mobile home, whereupon the bottom edge portions of the panels may be inserted therein while the upper edge portions are bonded to the bottom surface of the mobile home by means of additional blocks of expanded plastic similar to those utilized in forming the panel interlock mechanism.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
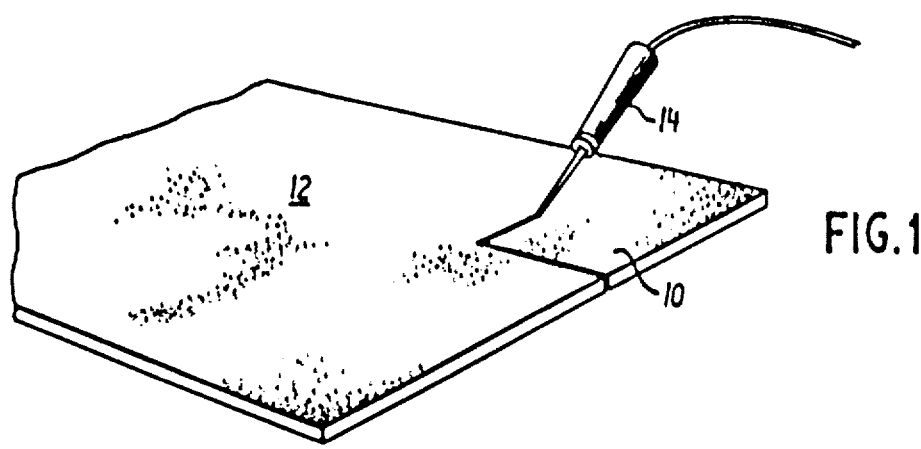
FIG. 1 is a perspective view of a base block of expanded foam plastic in conjunction with which cutting apparatus is employed so as to initiate manufacture of the base building panels according to the present invention.

Referring now to the drawings, and more particularly to FIG. 1 thereof, a base panel 10 is severed from a large base block 12 of expanded, foamed plastic, such as, for example, polystyrene, by means of an electrically heated cutting wire 14. Block 12 has a thickness of one inch and a density of 2.5 lb./cu. ft., and consequently, is excpetionally strong, it being capable of supporting a weight of 45 psi. Each base panel 10 is rectangular in shape and measures 36 inches in length and 24 inches in width, the wires 14 serving to simultaneously cut the panels 10 from block 12 as well as fuse the edges to the texture of masonry, cement, or brick, depending upon the temperature of the wires 14 and the speed with which they are passed through the block 12.

Figure 2:
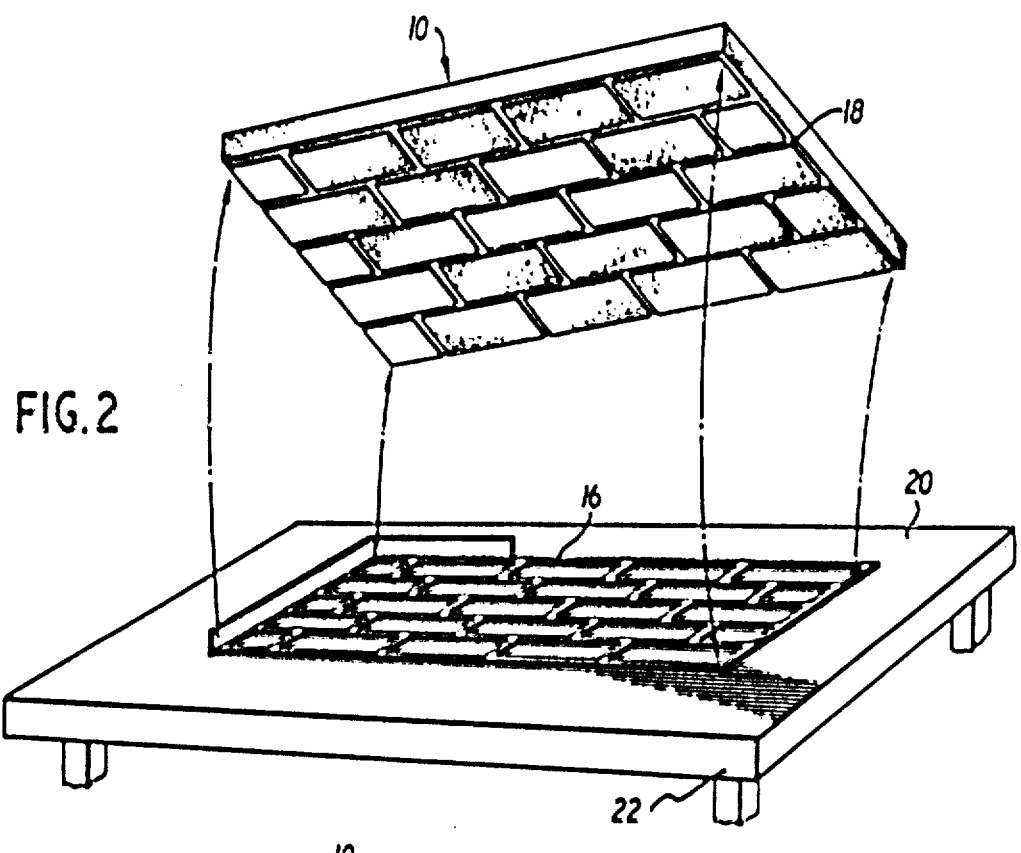
FIG. 2 is an exploded perspective view showing the heating elements structure utilized for forming the brick-and-mortar appearance upon the base panels of the present invention.

Referring now to FIG. 2, in order to provide the panels 10 with a brick-and-mortar appearance, a lattice-type, rectangular array of heating elements 16, similar to those employed within electric ovens, is utilized to form grooves 18 within the panel surface, the grooves 18 thus simulating the mortar while the remainder of the panel, that is, the nongrooved portion, simulates the brick. The heating elements 16 may be appropriately positioned and secured upon the top surface 20 of a supporting work table 22, and when the individual panels 10 are pressed downwardly, by suitable means not shown, upon the elements 16, grooves 18, having a depth of approximately three-eights inches, will consequently be created by a heat-melting or heat-softening process. Subsequently, the panels 10 may be painted, with exterior housepaint, such as, for example, water-based latex or Lucite, so as to be single-colored or multi-colored in accordance with a preconceived design, standard paint rollers being used where practicable. The painting, aside from the fact that such adds to the exterior decor of the home, is a necessity as it provides a protective skin coating for the expanded plastic which would otherwise deteriorate after an extended period of exposure to direct rays of sunlight.

Figure 3:
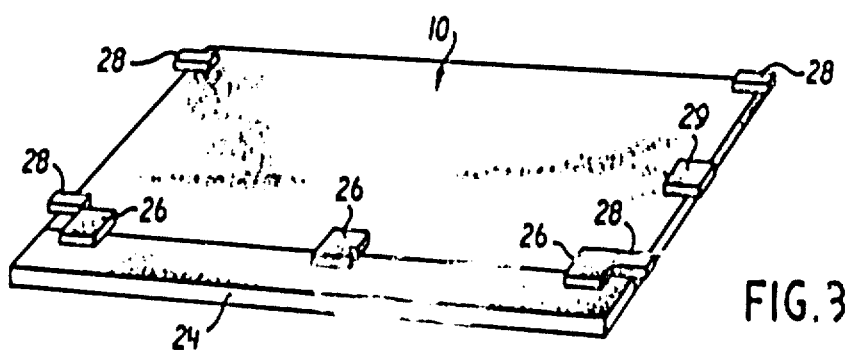
FIG. 3 is a rear view of a base panel showing an additional extension panel and the panel interlocking mechanism of the present invention.

Depending upon the height of the terrain surrounding the mobile home, the base panels 10 may have to be heightened or shortened. Taking into consideration the fact that the bottoms of panels 10 will be buried within the earth to a depth of from 3 to 5 inches, an initial determination of the overall required height of the panels 10 is made. For example, if the necessary height is 27 inches, then an extension of 3 inches must be added to the base panel 10. To accomplish this, another base panel 10 is cut into 3 inch wide panel strips 24 so as to have the dimensions of 3 inches in width and 36 inches in length. As shown in FIG. 3, one strip 24 is then attached to the bottom of each base panel 10 by means of panel extension foam blocks 26 which have been coated with melted polystyrene plastic adhesive, and which are secured to the rear surfaces of panel 10 and strip 24 in overlapping fashion relative thereto. The blocks 26 may be of the same material as block 12 and may have the dimensions of 3 inches in width and 4 inches in length. Each strip 24 is attached to the bottom of base panel 10 since that portion of the overall panel is to be buried within the earth, and in that way, the seam or junction between the base panel 10 and the extension strip 24 is not within view when the installation procedure is completed.

In addition to securing panel extension blocks 26 to the base panel 10, a second set of blocks 28, similar to blocks 26, are similarly secured to the rear surface of each base panel 10 for providing an interlocking mechanism between the panels. Each interlocking block 28 measures 2 inches in width and three inches in length, the blocks 28 being secured to the panel 10 in such a manner that each block 28 projects beyond the lateral edges of panel 10 by a distance of 1 inch. In addition, as seen in FIG. 3, the blocks 28 which are mounted at the left edge of panel 10 are set inward from the respective upper and lower edges of panel 10 by a distance of 2 inches. On the other hand, the blocks 28 which are mounted at the right edge of panel 10 have their respective lower and upper edges flush with the lower and upper edges of panel 10. In this manner, four blocks 28 will serve to interlock any two panels 10 along their common junction. If desired, another block 29 may be secured to the right edge of each panel 10 at a position between the upper and lower right edge blocks 28. Block 29 may measure, for example, 3 inches in width and 4 inches in height, the right portion of block 29 projecting beyond the right edged panel 10 by a distance of 1 inch, similar to the blocks 28.

Figure 4:
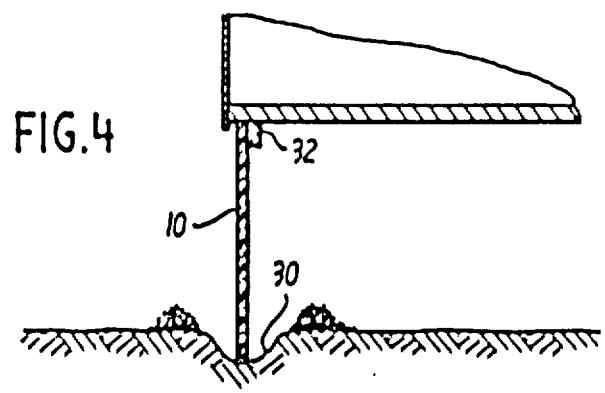
FIG. 4 is a cross-section view showing a base panel installed and bonded to the undersurface of the mobile home.

To install the panels 10 so as to enclose the open space existing below the mobile home, a perimetrical trench 30, having a depth of from 4 to 6 inches, is dug directly below the exterior walls of the mobile home, as shown in FIG. 4. The earth that is removed should be placed upon both sides of the trench in equal amounts so that upon replacing the same subsequent to the placement of the panel bottoms within the trench 30, the panels 10 will be properly supported within the ground. After inserting the bottom of the first panel 10 within the trench 30, the top portion of the first panel is secured to the mobile home by means of bond blocks 32 (See FIG. 5), which are similar to blocks 26 and 28, blocks 32 having been coated with suitable melted polystyrene plastic adhesive upon two adjacent surfaces such that they are simultaneously secured to the rear surface of panel 10 as well as the bottom surface of the mobile home. The adhesive is applied at 350°F and hardens in approximately 5 seconds, thus facilitating rapid installation of panels 10. During the installation of the panels, it should be made certain that the panels are in a true vertical position and are parallel to the exterior walls of the home, the use of a level being recommended.

Figure 5:
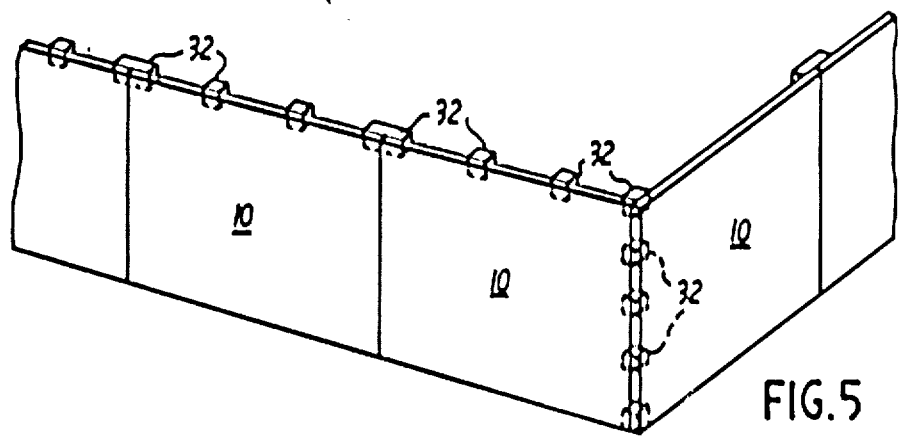
FIG. 5 is a perspective view showing several base panels mounted to the mobile home so as to form a corner structure with respect thereto.

In the instance that the installed panel is one that will form a corner of the enclosed structure along with another panel, then in lieu of the interlocking blocks 28, there are mounted upon the rear surface of one of the corner panels, and flush with that edge of the panel which will be located at the corner junction, additional bond blocks 32, as shown in FIG. 5. The adhesive is applied to two adjacent surfaces of each block 32 which will merely secure together the corner panels 10, whereas, with respect to the uppermost block 32, three adjacent surfaces will be coated with adhesive such that the two corner panels might also be bonded to the undersurface of the mobile home. Naturally, as discussed heretofore, interlocking blocks 28 will be secured at non-corner edges of corner panels, as well as at both edges of non-corner panels, to facilitate easy assembly of the panels along the sides of the home. It should also be noted that a particular side of the home may not be of such length as to accommodate an integral number of panels. Consequently, when forming a corner, it may be necessary to cut a panel to the proper width. In addition, spaces between the panels should be avoided, and if need be, filled with appropriate caulking.

Whenever any uninstalled panel is secured to an installed panel, care must be taken to properly align the mortar grooves, of the two adjacent panels, relative to each other, prior to permanently bonding the uninstalled panel to the undersurface of the mobile home. After bonding the panels to the home, the removed earth is replaced around the installed panels so as to strengthen and support the structure, as well as render a permanent foundation appearance.

Figure 6:
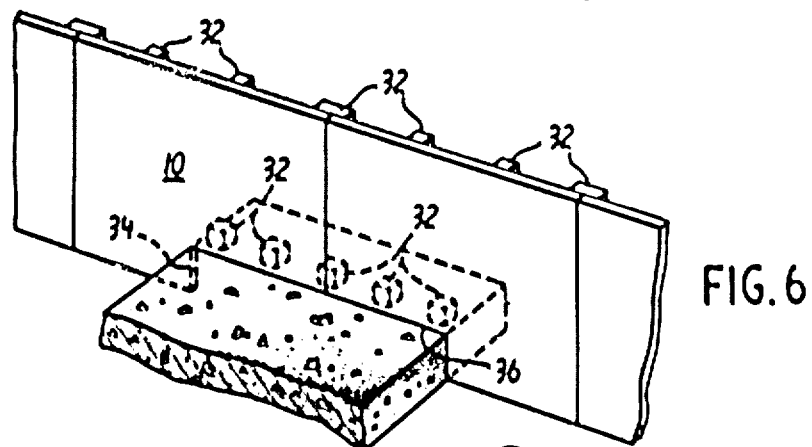
FIG. 6 is a partial perspective view of a plurality of base panels installed relative to a patio, porch, or step.

Referring now to FIG. 6, the installation procedure to be followed when encountering cement steps, patios, or porches, of small width, is apparent. In this instance, each panel 10 will have a notched portion 34 corresponding to the fixture to be crossed. To strengthen and support the bottom edge 36 of the notched portion, which does not have the benefit of being set into the earth as is the case with the remaining portions of the panels, bond blocks 32 are supplied, the blocks being coated upon two adjacent surfaces, the surface of each block 32 which will be secured to the panels 10 being coated with the plastic adhesive, while that surface which will be secured to the cement fixture being coated with a suitable dry wall adhesive. It should be noted that in the instance that the step, patio, or porch be large, in lieu of notching panels 10, panels having the precise height should be formed initially, similar to forming the panels depending upon the terrain, as discussed heretofore. Of course, even with these large patios or porches, some panels may nevertheless have to be notched, but if practicable, as many as possible should be prefabricated. Naturally, even when installing such prefabricated panels relative to the cement patios or porches, the installation procedure is quite similar in that bond blocks 32 are utilized, one surface being coated with dry wall adhesive while the other surface is coated with plastic adhesive. In addition, as the trailer bottom may have various structural fixtures affixed thereto, the top portions of the panels 10 may have to be similarly notched.

Figure 7:
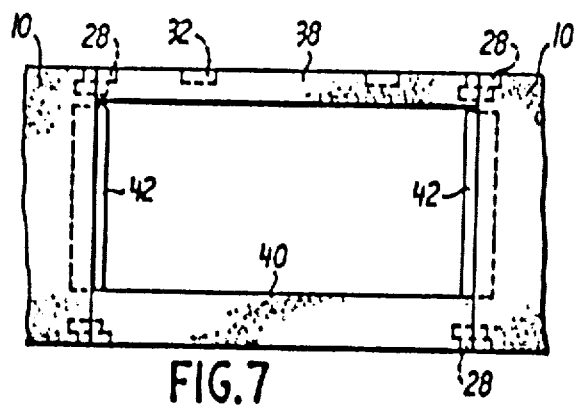
FIG. 7 is a partial front elevation view showing the component parts utilized to mount an access panel within the enclosure skirt for the mobile home.
Figure 8:
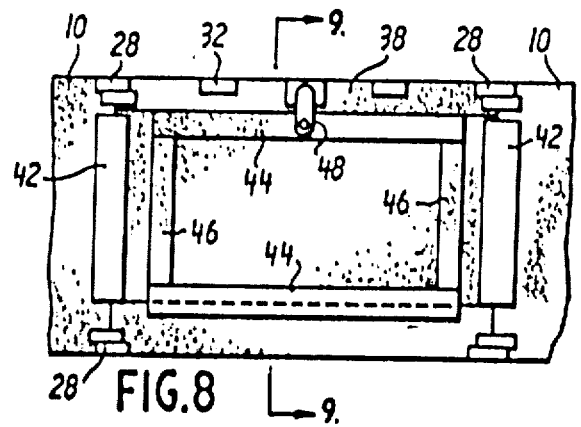
FIG. 8 is a rear elevation view similar to that of FIG. 7.
Figure 9:
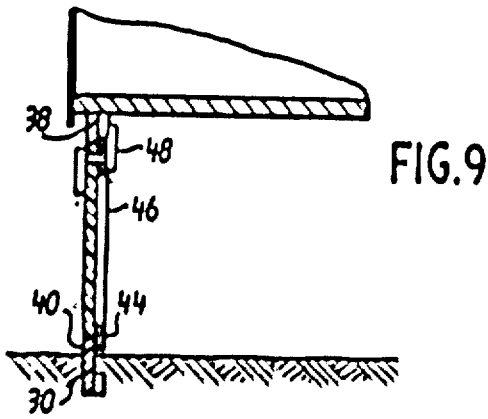
FIG. 9 is a cross-section view of the access panel structure as illustrated in FIG. 8 and taken along the line 9—9 of FIG. 8.

In order to provide easy access to electrical and water supply lines in case maintenance of the same proves necessary, or to provide access to storage areas underneath the home, access panels may be provided within the panel skirt enclosure. Referring to FIGS. 7–9, a strip of bricks 38, having a width of three inches, is severed from the top of a panel 10, to be used as the access panel, and bonded to the bottom surface of the mobile home utilizing the procedures discussed heretofore in connection with securing the top of the panel 10 to the undersurface of the home. In addition to utilizing bond blocks 32, interlocking blocks 28 are also employed to secure strip 38 to the previously installed adjacent base panel 10. Similarly, a 6 inch wide strip 40 is severed from the bottom of the access panel and placed within the excavated trench. The next adjacent full panel 10 is then installed, the top strip 38 being secured to this panel by means of an additional interlocking block 28, while the bottom strip 40 is secured to this panel, as well as the preceding full panel, by means of vertical access stiffeners 42 applied to the rear surfaces of the adjacent full panels, the lateral edges of stiffeners 42 overlapping, or projecting inwardly of, the access opening by a distance of ½ inch which will serve as a rearward stop or support means for the installed access panel.

Affixed to the rear surface of the access panel 10 are a pair of horizontal stiffeners 44, and a pair of vertical stiffeners 46, the vertical stiffeners 46 being set laterally inward from the side edges of access panel 10 so as to permit the edge portions of the panel to abut the front projecting surfaces of stiffeners 42. On the other hand, the upper horizontal stiffener 44 is mounted such that its upper edge is flush with the upper edge of panel 10, while the lower horizontal stiffener 44 is mounted such that its lower edge projects below the lower edge of panel 10, by a distance of approximately ½ inch, so as to serve as an interlocking mechanism with the lower severed strip 40, as particularly shown in FIGS. 8 and 9. In order to lock or open the access panel 10, a pair of right-angled brackets 48 are provided. The brackets are mounted to the rear surfaces of panel 10 and upper strip 38 by means of one leg, while the other leg projects outwardly from the respective front surfaces of the panel 10 and strip 38. It will be noted that the bracket 48 which is mounted to the panel 10 is affixed to such panel before upper horizontal stiffener 44 is secured, bracket 48 thus being wedged between the rear surface of panel 10 and stiffener 44, as particularly shown in FIG. 9. Access panel 10 is therefore opened by grasping its bracket 48 and pulling forwardly which will serve to pivot the panel 10 about its lower edge. After panel bracket 48 clears the strip bracket 48, the panel may be lifted upwardly and forwardly, thereby removing the same from the skirt enclosure, thus affording access to the particular utility supply.

To replace the access panel, the lower edge of the panel is set upon the upper surface of lower strip 40, the lower horizontal stiffener 44 lockingly engaging the upper rear surface of strip 40. The panel is then rotated rearwardly until its rear surface abuts the front projecting surfaces of vertical stiffeners 42.

Figure 10:
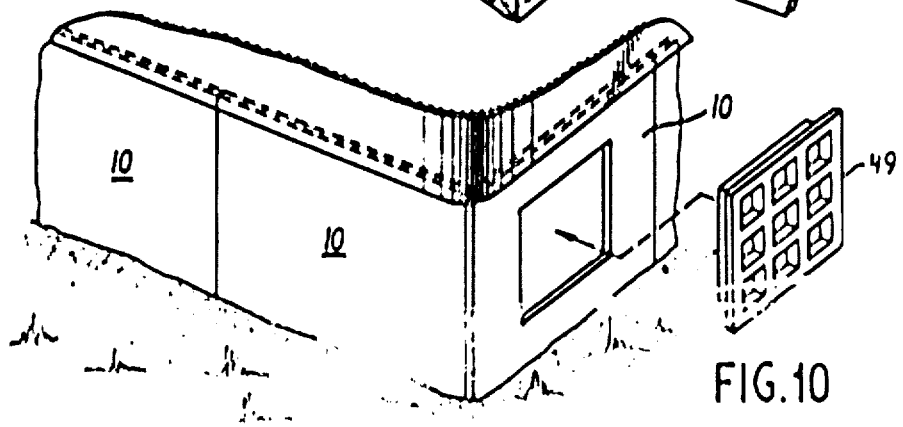
FIG. 10 is a partial perspective view of a corner of the enclosure structure showing the installation of vent means according to the present invention.

To control ventilations beneath the home, vent means 49 may be provided and inserted within the skirt enclosure. It is best to install such vents within the last panel on a side, as shown in FIG. 10, for the openings within the panels may be used as access openings, prior to installation of the vents, to aid in the installation of the end or corner panels, such as, for example, the securement of bonding blocks 32 to the rear surfaces of the corner panels, as well as replacement of the excavated earth relative to the interior bottom portions of the panels. To install the vents, proper-sized openings are cut within the panels 10 and the vents merely snap-fitted within the openings. Any seams or cracks may be sealed with appropriate caulking, and subsequently, paint may be applied to the vent, which is constructed of the same plastic as the panels, and any caulked area so as to give a finished appearance. If the entire enclosure is to be painted one color, then the various panels 10 may be painted prior to installation. If however, a particular design is contemplated, then the painting should be postponed until installation is completed, including any caulking, touch-up operations, or the like. When painting the enclosure in accordance with a preconceived design, care should be taken that the design is balanced upon any one side of the enclosure as well as with respect to the entire enclosure if it is a continuous design.

Figure 11:
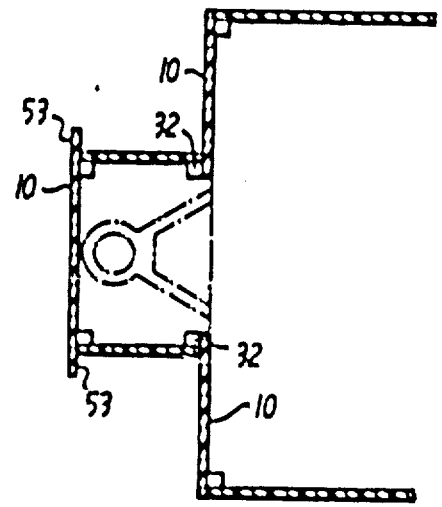
FIG. 11 is a horizontal cross-section view showing the tongue enclosure assembly.
Figure 12:
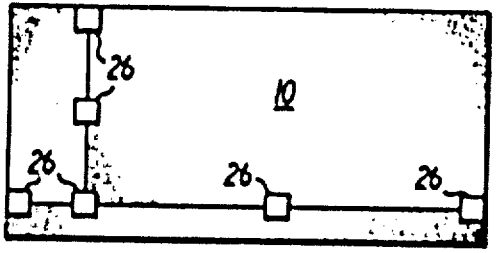
FIG. 12 is a view similar to that of FIG. 3 showing the pre-installation formation of a tongue enclosure panel.

To complete the skirt enclosure of the mobile home, and render a finished appearance to the same, the triangular trailer tongue must also be encased. To accomplish this, three panels will be required as shown in FIG. 11. If for example, 45 inch wide panels are required for the side and front tongue enclosure panels, then in addition to extending the height of the base panel, as discussed heretofore, the width of the base panels may likewise be extended. As the base panel measures 36 inches in width, a 9 inch extension panel may be secured to the panel 10 by means of additional panel extension blocks 26, as shown in FIG. 12.

Figure 13:
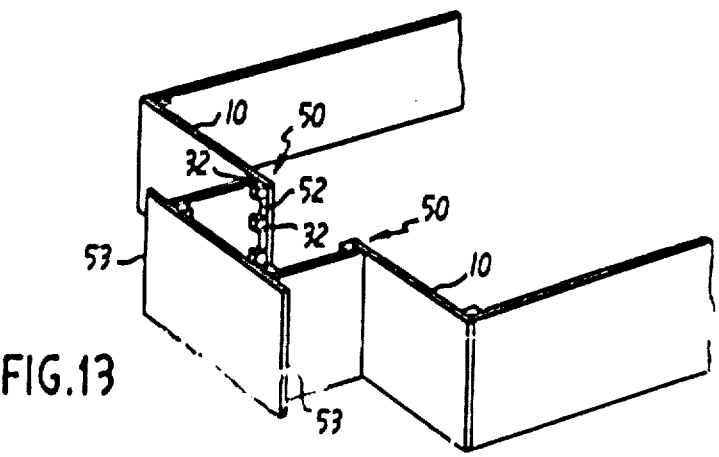
FIG. 13 is a partial perspective view of the tongue enclosure showing the bonding of the tongue side and front enclosure panels relative to the home skirt enclosure.

When installing the side tongue enclosure panels, the interior surfaces should not be flush with the edges of the skirt panels previously installed as there will not be present sufficient surface area to which corner bonding blocks 32 may be secured for bonding together the tongue side panels and the mobile home panels placed along a side of the home. If the panels were so placed, then the bonding blocks 32 would have to be placed exteriorly of the enclosure, thus rendering an unsightly appearance. To overcome this problem, the side panels of the tongue enclosure are set in from the home skirt panels, at a point generally indicated by reference character 50, as shown in FIG. 13. This setting affords an interior corner 52 formed between the home panels and the tongue side panels, between which bonding blocks 32 may be placed so as to secure the various panels together. Thus, a first tongue side panel installed relative to a home panel. The tongue front panel is then secured to the tongue side panel using procedures discussed heretofore in connection with normal corner formations, and subsequently, the second tongue side panel is installed to the front tongue panel and the succeeding home panel. If any excess corner overlap 53 exists, such may be easily removed by the use of a hand saw.

To complete the tongue enclosure, a canopy type cover, not shown, may be installed atop the tongue enclosure. The cover should be dimensioned such that it projects beyond the tongue side panels by a distance approximating 1 inch and beyond the front panel by a distance of approximately 2 inches, so as to present a proper cover appearance. Hence, if the side and front panels were each 45 inches in length, then the cover should be in the form of a square whose sides measure 47 inches in length. The cover may be secured to the front and side panels by means of bonding blocks 32 which are secured to the side and front panels at locations similar to those which would be used if the side and front panels were being secured to the undersurface of the mobile home, as discussed heretofore. A planter may be subsequently affixed to the tongue cover if desired, and for that reason it is recommended that the cover be fabricated from a block of foam similar to that of block 12, but having a thickness of 1.75 inches, thus asserting even greater strength and support.

Obviously, many modifications and variations of the present invention are possible in light of the above teachings. It is to be understood therefore that within the scope of the appended claims the present invention may be practiced otherwise than as specifically described herein. For example, the building panels of the present invention may be utilized as interior decorative panels for homes and businesses, or they may be utilized to fabricate garden planters, walls, or fences.

What is claimed as new and desired to be secured by Letters Patent of the United States is:

1. A method of manufacturing a brick-textured foamed thermoplastic building panel comprising the steps of severing a base panel from a rigid block of a foamed thermoplastic material having a density in the order of 2.5 lb./cu. ft., and simultaneously fusing the edges by means of a heated element whereby the edges of the panel exhibit the texture of masonry, cement or brick depending upon the temperature of the heated element and the speed by which the heated element is passed through the block, and forming a brick and mortar array on one surface portion of said panel by positioning the panel above a lattice-type rectangular array of heating elements and pressing the panel downwardly upon said elements to such an extent that the elements soften the material of the panel and form therein grooves which simulate mortar while the ungrooved portions of the panel simulate bricks.

2. A method as in claim 1 including the further step of painting the foamed thermoplastic panel subsequent to the formation of the grooves.

3. A method as in claim 2 wherein the foamed thermoplastic panel is a foamed polystyrene panel.

* * * * *